United States Patent
Guinaldo Fernandez et al.

(10) Patent No.: US 9,322,276 B2
(45) Date of Patent: Apr. 26, 2016

(54) HIGHLY INTEGRATED LEADING EDGE OF AN AIRCRAFT LIFTING SURFACE

(71) Applicant: AIRBUS OPERATIONS S.L., Getafe (Madrid) (ES)

(72) Inventors: Enrique Guinaldo Fernandez, Madrid (ES); Francisco Javier Honorato Ruiz, Madrid (ES); Francisco Jose Cruz Dominguez, Madrid (ES)

(73) Assignee: Airbus Operations S.L., Madrid (ES)

( * ) Notice: Subject to any disclaimer, the term of this patent is extended or adjusted under 35 U.S.C. 154(b) by 406 days.

(21) Appl. No.: 13/943,115

(22) Filed: Jul. 16, 2013

(65) Prior Publication Data

US 2014/0133987 A1 May 15, 2014

(30) Foreign Application Priority Data

Jul. 17, 2012 (EP) .................................. 12382284

(51) Int. Cl.
*B64C 1/00* (2006.01)
*F01D 5/14* (2006.01)
*B64C 3/28* (2006.01)

(52) U.S. Cl.
CPC ... *F01D 5/14* (2013.01); *B64C 3/28* (2013.01); Y10T 29/49336 (2015.01)

(58) Field of Classification Search
CPC ............. B64C 3/00; B64C 3/18; B64C 3/182; B64C 3/185; B64C 3/20; B64C 3/24; B64C 3/26; B64C 3/27; B64C 1/12
USPC ...................... 244/35 R, 123.1–123.14, 129.1
See application file for complete search history.

(56) References Cited

U.S. PATENT DOCUMENTS

| | | | |
|---|---|---|---|
| 4,105,817 A | 8/1978 | Dunahoo | |
| 6,237,873 B1 * | 5/2001 | Amaoka et al. ............ | 244/123.7 |
| 6,638,466 B1 | 10/2003 | Abbott | |
| 8,408,493 B2 * | 4/2013 | Barnard et al. .............. | 244/119 |
| 8,864,076 B2 * | 10/2014 | Wood ......................... | 244/123.1 |

(Continued)

FOREIGN PATENT DOCUMENTS

| EP | 0 217 315 | 4/1987 |
|---|---|---|
| EP | 1 176 089 | 1/2002 |

(Continued)

OTHER PUBLICATIONS

European Search Report dated Nov. 28, 2012 in EP 12382284.

*Primary Examiner* — Christopher P Ellis
*Assistant Examiner* — Richard G Davis
(74) *Attorney, Agent, or Firm* — Nixon & Vanderhye P.C.

(57) ABSTRACT

A method for manufacturing a leading edge profile section of an aircraft lifting surface is provided. The method comprises the following steps: a) providing a set of laminated preforms of a composite material configured with a suitable shape for constituting the leading edge profile section; b) arranging said laminated preforms in a curing tooling and subjecting the assembly to an autoclave cycle to co-cure said laminated preforms; c) demolding the curing tooling in a spanwise direction towards the aircraft symmetry plane. The invention also comprises a leading edge profile section manufactured by said method comprising in addition to the skin of the leading edge profile section, one or more of the following structural elements: an auxiliary spar, a longitudinal stiffener reinforcing an auxiliary spar, a longitudinal stringer reinforcing the skin of the leading edge profile.

15 Claims, 4 Drawing Sheets

(56) References Cited

U.S. PATENT DOCUMENTS

2011/0049298 A1     3/2011    Makela
2012/0118400 A1     5/2012    Bouillon et al.
2013/0320142 A1*   12/2013   Nordman ................... 244/123.5

FOREIGN PATENT DOCUMENTS

EP    2 130 762    12/2009
EP    2 196 391    6/2010

* cited by examiner

HIGHLY INTEGRATED LEADING EDGE OF AN AIRCRAFT LIFTING SURFACE

FIELD OF THE INVENTION

The present invention refers to the leading edge of an aircraft lifting surface and more in particular to highly integrated leading edge of an aircraft lifting surface.

BACKGROUND OF THE INVENTION

An aircraft lifting surface (see FIG. 1a) is usually structured by leading edges 11, torsion boxes 13, trailing edges 15 with control surfaces (flaps, elevators, rudders, etc.), a root joint 17 and tips 18.

A leading edge 11 is a structure responsible for keeping the aerodynamic surface with a torsion box surface, for supporting the static or cyclic structural loads involved and for protecting the torsion box from bird impacts. It is the part of the lifting surface that first contacts the air and the foremost edge of an airfoil section.

A known leading edge 11 (see FIG. 1b) comprises, on the one side, several ribs 21, called leading edge ribs (see FIGS. 2a, 2b), attached to the front spar 19 of the torsion box 13 and, on the other side, an aerodynamic profile 25 attached to the leading edge ribs 21 and to the flanges of the front spar 19 in order to keep the overall aerodynamic shape of the lifting surface. Leading edges further comprising additional elements like spars, vertical stiffeners and sandwich cores are also known in the art.

Nowadays, and particularly in the aeronautical industry, composite materials with an organic matrix and continuous fibers, especially CFRP (Carbon Fiber Reinforced Plastic) are widely used in a great variety of structural elements. Specifically, all the elements which make up the aforementioned leading edges 11 (leading edge ribs 21 and aerodynamic profile 25) can be manufactured using CFRP.

Typically, all structural elements forming an aircraft leading edge (aerodynamic profile, ribs, spars, vertical stiffeners) are manufactured separately and then joined by means of rivets with the aid of complicated tooling to achieve the necessary tolerances, which are given by the aerodynamic, assembly and structural requirements.

A well-known method for manufacturing said elements uses prepreg technology. In a first step, a flat lay-up of composite prepreg plies is prepared. Then the required shape is given to the element by means of a classical hot-forming process. After getting the required shape, the element is cured in a male or female tooling depending on the tolerances required and the overall manufacturing cost. Finally, after the curing cycle, the element contours are trimmed getting the final geometry, and then the element is inspected by an ultrasonic system to assure its quality.

The cost of a leading edge manufactured with said method is high because said steps shall be carried out independently for each element and a final assembly stage is needed.

The use of Resin Transfer Moulding (RTM) technology with dry fibers for manufacturing a leading edge in order to increase the level of integration and reduce the overall manufacturing costs is also known. Using this RTM technology, all dry laminates are formed to the final shape by means of classical hot-forming processes. Then, all formed laminates are co-injected together in a closed mould. The main benefits are linked to two facts; firstly, all reinforcements (like ribs, stiffeners and spars) are integrated without requiring additional subassembly activities; and secondly, only one curing, trimming and inspection process is required per element.

Nevertheless, the tooling set required to build the whole element is complex making the demoulding process difficult and the overall manufacturing costs still high.

SUMMARY OF THE INVENTION

It is an object of the present invention to provide a method for manufacturing a monolithic leading edge profile section for reducing the number of different elements of the leading edge of an aircraft lifting surface to be manufactured and installed.

It is another object of the present invention to provide a monolithic leading edge profile section having an optimized configuration for complying with the structural requirements of leading edges of aircraft lifting surfaces.

In a first aspect, the above-mentioned objects are met by a method for manufacturing a leading edge profile section of a given configuration comprising the following steps: a) providing a set of laminated preforms of a composite material configured with a suitable shape for constituting the leading edge profile section; b) arranging said laminated preforms in a curing tooling and subjecting the assembly to an autoclave cycle to co-cure said laminated preforms; c) demoulding the curing tooling in a spanwise direction towards the aircraft symmetry plane.

In a second aspect, the above-mentioned objects are met by a configuration of a leading edge profile section including, in addition to the skin of the leading edge profile section, one or more of the following structural elements:

an auxiliary spar parallel or non-parallel to the frontal spar of the torsion box of the aircraft lifting surface;

a longitudinal stiffener reinforcing an auxiliary spar;

a longitudinal stringer reinforcing the skin of the leading edge profile.

Each monolithic leading edge profile section with this configuration is obtained by the mentioned manufacturing method. Said set of laminated preforms are configured for constituting all the components of the leading edge profile section and comprise:

a first laminated preform for constituting at least in part the skin of the leading edge profile section;

one or more second laminated preforms for constituting at least in part said one or more auxiliary spars;

one or more third laminated preforms for constituting at least in part said stiffeners and said stringers.

Other desirable features and advantages of the aircraft lifting surface according to this invention will become apparent from the subsequent detailed description of the invention and the appended claims, in relation with the enclosed drawings.

DETAILED DESCRIPTION OF THE INVENTION

Figure 1A:
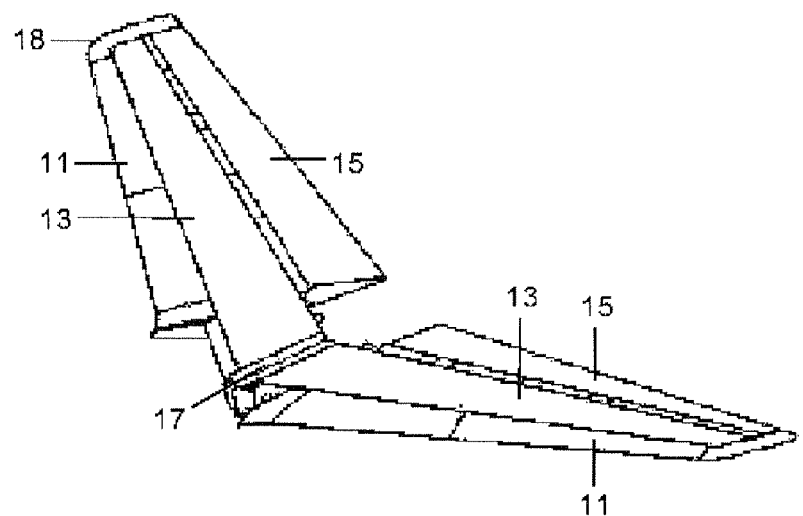
FIG. 1a is a perspective view of a known horizontal tail plane showing the torsion boxes, the leading edges and the trailing edges with control surfaces.
Figure 1B:
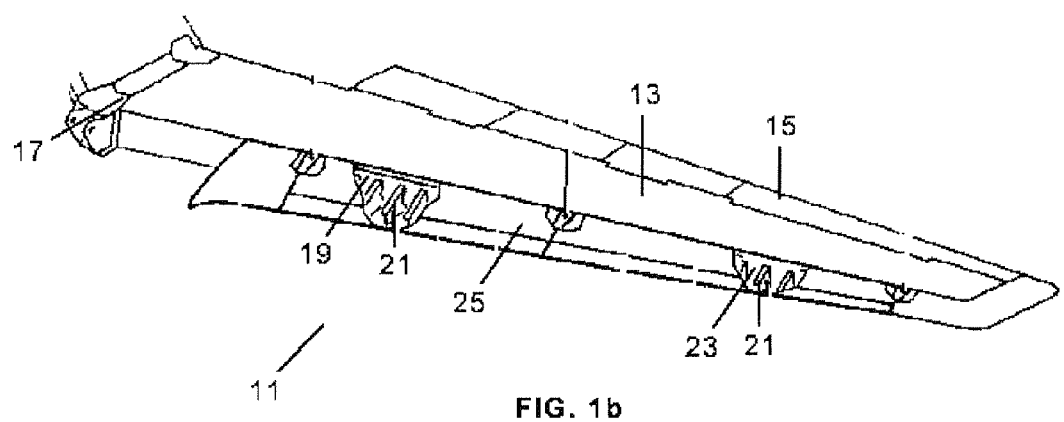
FIG. 1b is perspective view of one side of the horizontal tail plane of FIG. 1a with cutaways to improve the visibility of the leading edge structure showing the leading edge ribs and the leading edge profiles.
Figure 2A:
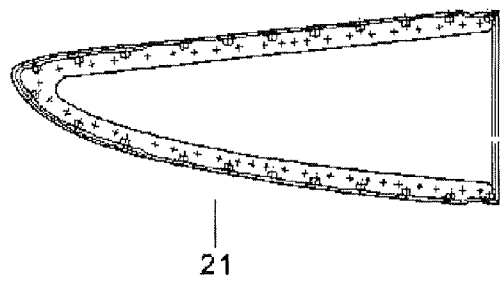
FIGS. 2a and 2b are, respectively, side and plan views of a leading edge rib showing the interfaces with the front spar and with the leading edge profiles and particularly the holes located in the rib flanges to make the joint.
Figure 2B:
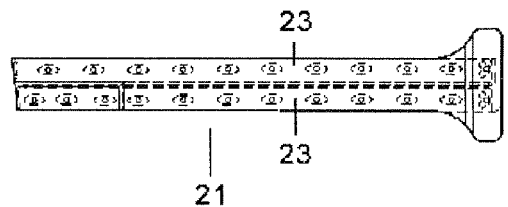
Figure 3A:
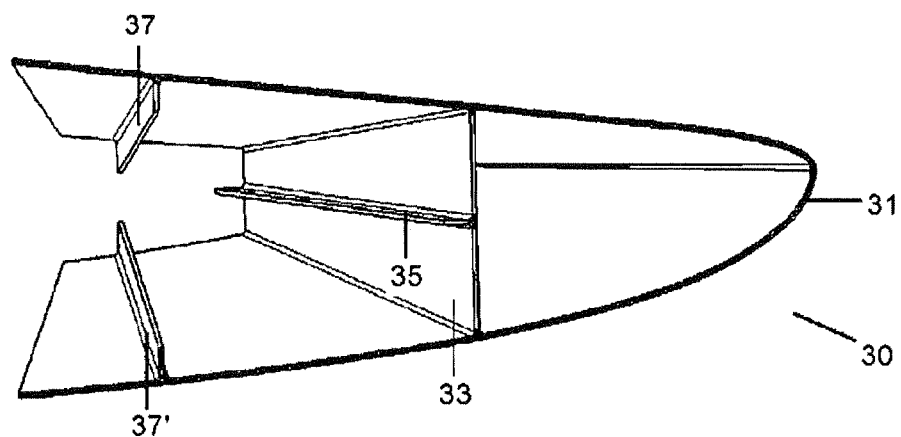
FIG. 3a is a schematic perspective view of a leading edge profile according to the present invention including an auxiliary spar with a longitudinal stiffener and stringers reinforcing the leading edge skin.

FIG. 3a shows a monolithic leading edge profile section 30 according to the invention comprising a leading edge skin 31 and a longitudinal auxiliary spar 33. All the leading edge profile sections 30 are attached to the leading edge ribs 21 and to the frontal spar in a similar manner to the above-mentioned known leading edges.

The position of the auxiliary spar 33 could be closer or farther from the front spar 19 of the torsion box 13 depending on the aerodynamic profile geometry, manufacturing constraints, bird impact analysis results and any other certification requirements.

The leading edge profile 30 also comprises one longitudinal stiffener 35 of the auxiliary spar 33 arranged perpendicularly to it in the middle of its height in order to reinforce the web of the auxiliary spar 33 to improve its structural behavior to support the loads involved and bird impacts. The thickness and height of this longitudinal stiffener 35 are a function of the specific structural and bird impact requirements.

The leading edge profile 30 also comprises two stringers 37, 37' in, respectively, the upper and lower zones of the leading edge skin 31 closer to the frontal spar 19 in order to improve the structural behavior and stability of the leading edge skin 31. The thickness, height and position of these stringers 37, 37' primarily depends on the structural requirements in terms of damage tolerance and buckling and, secondarily, in terms of bird impact.

Figure 3B:
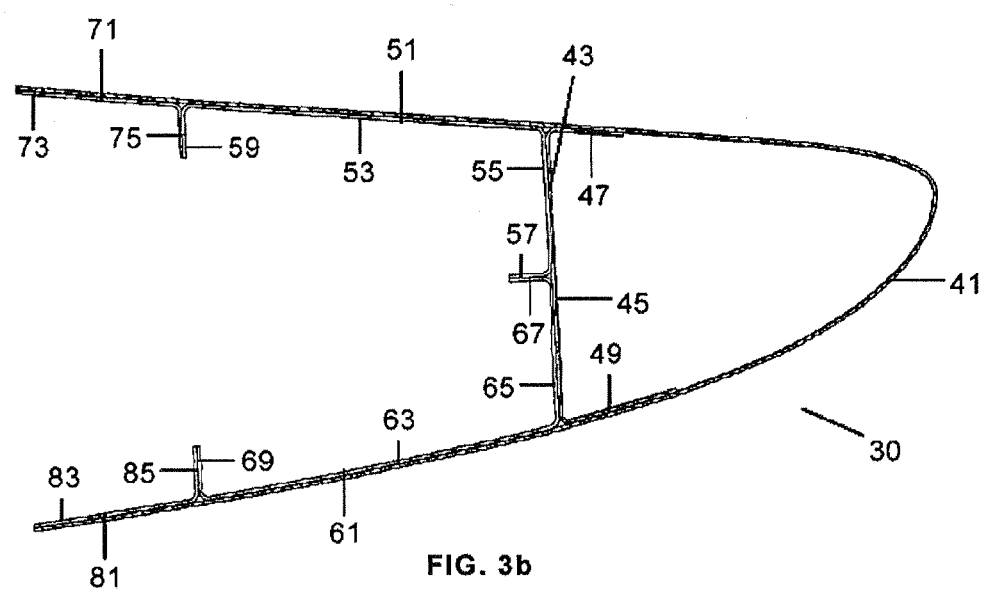
FIG. 3b is a schematic cross section view of the laminated preforms used to manufacture the leading edge profile of FIG. 3a according to the present invention.

The monolithic leading edge profile section 30 of FIG. 3a can be manufactured by a method according to the invention based on prepreg technology that will now be described in reference to FIG. 3b.

The basic steps of the method are the following:

Preparing the set of laminated preforms that will a leading edge profile section, laying-up for each of them a flat lay-up of composite prepreg plies and subjecting each flat lay-up to a hot-forming process on a suitable tooling to give it the desired shape. The laminated preforms can also be made directly with the final shape by means of an automatic fiber placement machine. The expression "laminated preform" as used in this specification designates a composite item that requires an individual process, such as hot-forming, press-forming, etc. to form it with certain characteristics and that is intended to be integrated with other elements in the manufacturing process of the product to which it belongs.

Arranging together all the laminated preforms on a suitable tooling and subjecting the assembly to an autoclave cycle to co-cure the laminated preforms.

Demoulding the tooling in spanwise direction towards the aircraft symmetry plane, taking benefit from the tapered section of the leading edge from the root to the tip of the lifting surface.

Trimming and inspecting the assembly.

The laminated preforms used to manufacture the leading edge profile section of FIG. 3a are the following:

A first laminated preform 41 that will constitute the outer surface of the leading edge skin 31.

A second laminated preform 43, comprising a web 45 and two flanges 47, 49 that is arranged inside the first laminate preform 41 with its flanges 47, 49 oriented towards the flight direction. The web 45 will form part of the auxiliary spar 33 and the flanges 47, 49 will form part of the leading edge skin 31.

A first pair of third laminated preforms 51, 61 that have a polygonal shape and comprise main sides 53, 55; 63, 65 that will form part, respectively, of the leading edge skin 31 and of the auxiliary spar 33, and flanges 57, 59; 67, 69 that will, respectively, form the longitudinal stiffener 35 and form part of the stringers 37, 37'.

A second pair of third laminated preforms 71, 81 that have an L-shape comprising webs 73; 83 that will form part of the leading edge skin 31 and feet 75; 85 that will form part of the stringers 37, 37'.

The thickness and composite material of each laminated preform are defined according to the structural needs of the leading edge profile section.

Figure 4A:
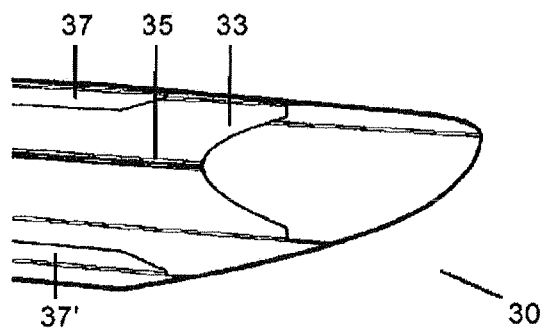
FIG. 4a is a schematic perspective view of an end of the leading edge profile of FIG. 3a showing the run-out design of the webs of the auxiliary spar and the longitudinal reinforcing elements.
Figure 4B:
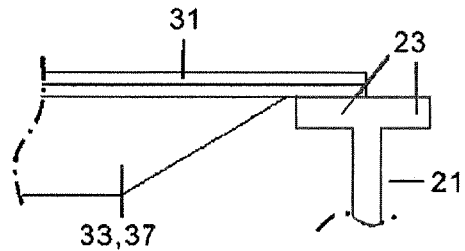
FIG. 4b is a schematic frontal view of the interface between the flanges of a leading edge rib and a leading edge profile, showing the run-out design of the auxiliary spar.

The leading edge 11 is mounted using the leading edge ribs 21 as common interface between adjacent leading edge profile sections 30. In order to perform the joint to the flanges 23 of the leading edge ribs 21, the inner longitudinal reinforcing elements like the auxiliary spar 33 (with its longitudinal stiffener 35) and the stringers 37, 37' are removed at the end of each leading edge profile section 30 through a web run-out as shown in FIGS. 4a and 4b due to two main reasons. Firstly, in order to avoid any joint to the webs of the leading edge ribs 21 that is difficult to perform due to the lack of access. Secondly, in order to have a clean interface between the rib flanges 23 and the skin 31 of each leading edge profile 30, without needing any mousehole in the rib flanges 23 and, at the same time, avoiding any issue in the final assembly line and in the operational life of the aircraft.

Depending on the results of the bird strike analysis and the manufacturing constraints, the auxiliary spar 33 may be configured in a different manner to that shown in FIG. 3a.

Figure 5A:
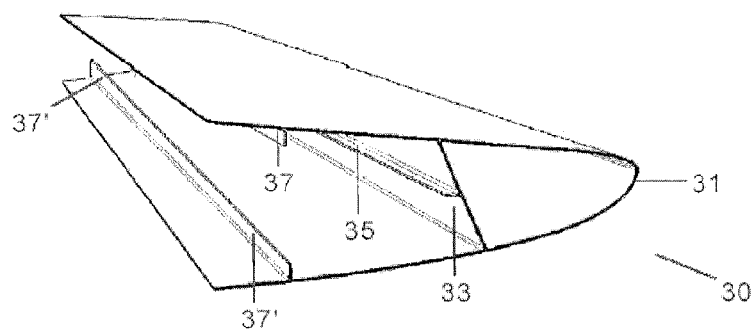
FIG. 5a is perspective view of a leading edge profile according to the present invention where the auxiliary spar is not parallel to the front spar of the torsion box.

FIG. 5a shows a leading edge profile section 30 with an auxiliary spar 33 that is not parallel to the front spar of the torsion box.

Figure 5B:
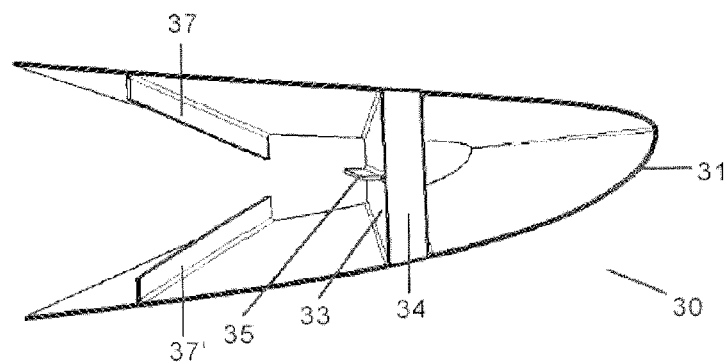
FIG. 5b is a perspective view of a leading edge profile according to the present invention having the auxiliary spar web reinforced by means of an inner core.

FIG. 5b shows a leading edge profile section 30 with an auxiliary spar 33 having an inner core 34 made of a sandwich honeycomb, solid foam or any other material with high impact resistance capabilities that reinforces its structure and protects the torsion box against delaminations.

Figure 6A:
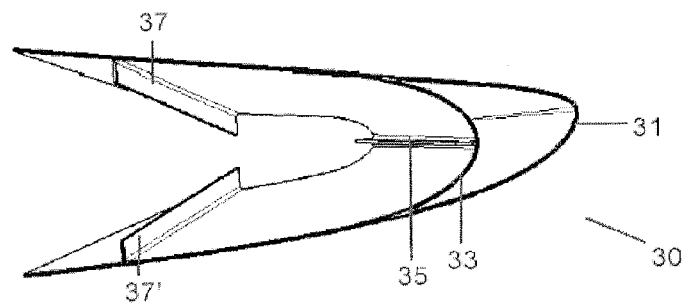
FIG. 6a is a perspective view of a leading edge profile according to the present invention having an auxiliary spar with a curved web.

FIG. 6a shows a leading edge profile section 30 with an auxiliary spar 33 of a curved shape in the same direction as the curved leading edge skin 31 increasing the local strength.

Figure 6B:
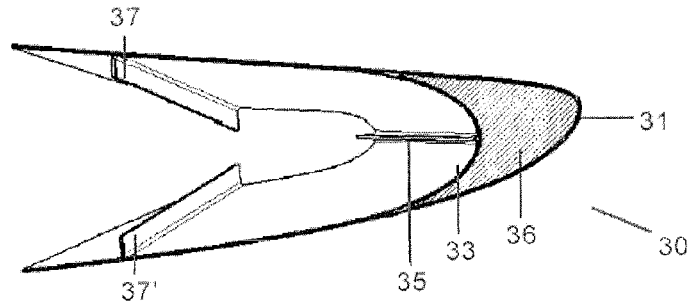
FIG. 6b is a perspective view of a leading edge profile according to the present invention having an auxiliary spar with a curved web and a core filling the space between the auxiliary spar and the skin.
Figure 7A:
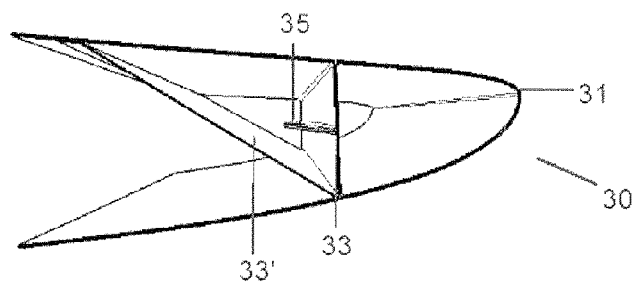
FIGS. 7a, 7b, 7c, 7d and 7e are perspective views of leading edge profiles according to the present invention having additional spars.
Figure 7B:
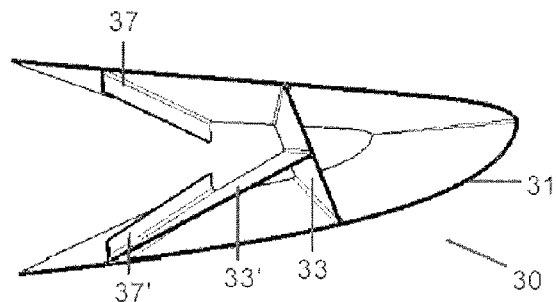
Figure 7C:
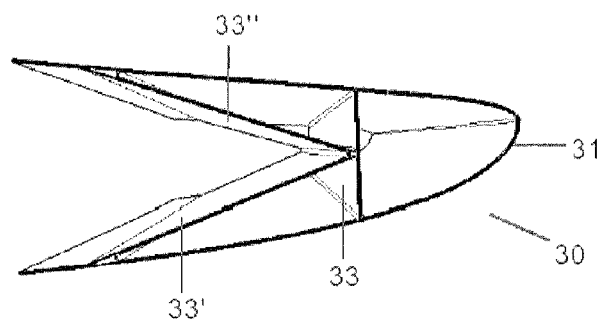
Figure 7D:
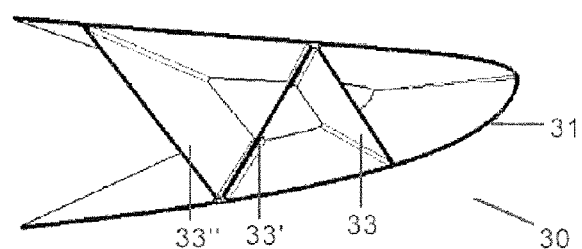
Figure 7E:
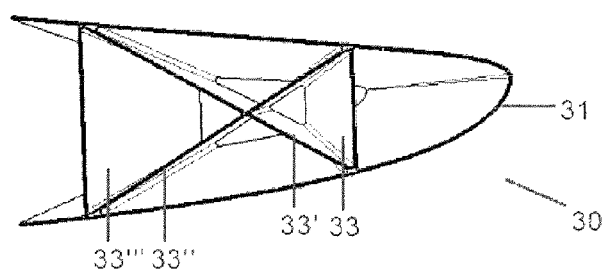

FIG. 6b shows a leading edge profile section 30 with an auxiliary spar 33 of a curved shape in the same direction as the curved leading edge skin 31 and an inner core 36 made of a sandwich honeycomb, solid foam or any other material with high impact resistance capabilities that works as a bumper and protects the torsion box against delaminations filling the space between the auxiliary spar 33 and the leading edge skin 31.

FIGS. 7a, 7b, 7c, 7d, 7e show leading edge profile sections 30 with more than one auxiliary spar, whether parallel or non-parallel to the front spar in different configurations.

All the above mentioned configurations of a leading edge profile section 30 can be manufactured with a set of similar laminated preforms to the above-mentioned set for manufacturing the leading edge profile section 30 with the configuration shown in FIG. 3a.

Among others, the present invention has the following advantages:

Provides a monolithic leading edge profile using composite prepreg technology.

Reduces the overall cost of manufacturing and assembling the leading edge structure.

Allows an optimized leading edge design for an aircraft lifting surface.

Although the present invention has been described in connection with various embodiments, it will be appreciated from the specification that various combinations of elements, variations or improvements therein may be made, and are within the scope of the invention.

The invention claimed is:

1. An aircraft lifting surface comprising:
   leading edge profile sections,
   torsion boxes each having a front spar adjacent at least one of the leading edge profile sections; and
   trailing edge sections;
   wherein the leading edge profile sections each include:
      a skin formed of a first preform of a composite material, wherein a cross section of the skin is C-shaped and the skin includes an upper skin portion, a lower skin portion and a leading edge between the upper and lower skin portions, and
      an auxiliary spar within each leading edge profile section and formed of a second preform of a composite material, the auxiliary spar including a web spanning between the upper and lower skin portions, an upper flange abutting the upper skin portion and a lower flange abutting the lower skin portion, wherein the upper and lower flanges extend from the web towards the leading edge;
   wherein each of the leading edge profile sections includes leading edge ribs attached to the front spar of one of the torsion boxes.

2. The aircraft lifting surface according to claim 1, wherein the at least one auxiliary spar is configured with a web run-out in the ends of each leading edge profile section.

3. An aircraft lifting surface comprising:
   leading edge profile sections,
   torsion boxes each having a front spar adjacent at least one of the leading edge profile sections, and
   trailing edge sections;
   wherein the leading edge profile sections each include:
      a skin formed of a first preform of a composite material, wherein a cross section of the skin is C-shaped and the skin includes an upper skin portion, a lower skin portion and a leading edge between the upper and lower skin portions,
      an auxiliary spar within each of the leading edge profile sections, wherein the auxiliary spar is formed of a second preform of a composite material, and includes a web spanning between the upper and lower skin portions, an upper flange abutting the upper skin portion and a lower flange abutting the lower skin portion, wherein the upper and lower flanges extend from the web towards the leading edge, and
      a longitudinal reinforcing element adjacent the web of the auxiliary spar and formed of a third preform of a composite material between the upper flange and the lower flange of the auxiliary spar,
   wherein each leading edge profile section includes leading edge ribs configured to be attached to a front spar of a torsion box.

4. The aircraft lifting surface according to claim 3, wherein:
   the auxiliary spar in each of the leading edge profile sections includes a longitudinal stiffener in a middle section of the web in a direction between the upper and lower skin portions;
   said auxiliary spar and said longitudinal stiffener are configured with a web run-out at end regions of the corresponding leading edge profile section.

5. The aircraft lifting surface according to claim 4, wherein:
   each of the leading edge profile sections includes longitudinal stringers reinforcing the upper and lower skin portions; and
   said longitudinal stringers are configured with a web run-out at end regions of the corresponding leading edge profile section.

6. The aircraft lifting surface according to claim 4, wherein the auxiliary spar has a planar shape.

7. The aircraft lifting surface according to claim 6, wherein the auxiliary spar comprises an inner reinforcing core.

8. The aircraft lifting surface according to claim 4, wherein the auxiliary spar is configured with a curved shape extended towards the leading edge.

9. The aircraft lifting surface according to claim 8, further comprising a reinforcing core filling a space between said curved-shaped auxiliary spar and the C-shaped skin.

10. A leading edge profile section of an aircraft lifting surface comprising:
    a skin formed of a first preform of a composite material, wherein a cross section of the skin is C-shaped and the skin includes an upper skin portion, a lower skin portion, and a leading edge between the upper and lower skin portions;
    an auxiliary spar within the leading edge profile section and formed of a second preform of a composite material, the auxiliary spar including a web spanning between the upper and lower skin portions, an upper flange abutting the upper skin portion and a lower flange abutting the lower skin portion, wherein the upper and lower flanges extend from the web towards the leading edge;
    a stiffener rib between the upper flange and the lower flange of the auxiliary spar, the stiffener rib extending from the web of the auxiliary spar in a lengthwise direction of the leading edge profile section; and
    a stringer extending from at least one of the upper and lower skin portions in the length wise direction;
    wherein the stiffener rib and the stringer are formed of a third preform of composite material.

11. The leading edge profile section as in claim 10 wherein the auxiliary spar includes a tapered end proximate to an end of the leading edge profile section.

12. The leading edge profile section as in claim 10 wherein the auxiliary spar, stiffener rib and stringers each include a tapered end proximate to an end of the leading edge profile section.

13. The leading edge profile section as in claim 10 wherein the stiffener rib is in a middle section of the web along a direction between the upper and lower skin portions.

14. The leading edge profile section as in claim 10 wherein the web is planar, and the stiffener rib is perpendicular to the web.

15. The leading edge profile section as in claim 10 further comprising:
   a second stringer extending from the other one of the upper and lower skin portions in the length wise direction, wherein the second stringer is formed of a fourth preform of composite material and the fourth preform forms a portion of the stiffener rib.

* * * * *